United States Patent
Kulkarni

(10) Patent No.: US 9,870,237 B2
(45) Date of Patent: Jan. 16, 2018

(54) SYSTEM AND METHOD FOR SUPPORTING DISTRIBUTED CLASS LOADING IN A VIRTUAL MACHINE (VM)

(71) Applicant: Oracle International Corporation, Redwood Shores, CA (US)

(72) Inventor: Gajanan Kulkarni, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/878,280

(22) Filed: Oct. 8, 2015

(65) Prior Publication Data

US 2016/0103694 A1  Apr. 14, 2016

Related U.S. Application Data

(60) Provisional application No. 62/063,652, filed on Oct. 14, 2014.

(51) Int. Cl.
  *G06F 9/445* (2006.01)
  *G06F 9/455* (2006.01)
(52) U.S. Cl.
  CPC ...... *G06F 9/44521* (2013.01); *G06F 9/45504* (2013.01)
(58) Field of Classification Search
  None
  See application file for complete search history.

(56) References Cited

U.S. PATENT DOCUMENTS

| | | | |
|---|---|---|---|
| 6,339,841 B1 | 1/2002 | Merrick et al. | |
| 6,470,345 B1 * | 10/2002 | Doutre | G06F 17/30067 |
| 6,470,494 B1 | 10/2002 | Chan et al. | |
| 7,003,768 B2 * | 2/2006 | Daynes | G06F 9/45516 718/1 |
| 7,035,870 B2 * | 4/2006 | McGuire | G06F 9/52 707/704 |
| 7,337,434 B2 | 2/2008 | Nichols et al. | |
| 7,546,593 B2 * | 6/2009 | Petev | G06F 9/445 717/166 |
| 8,060,812 B2 | 11/2011 | Branda et al. | |
| 8,250,559 B2 | 8/2012 | Daynes et al. | |
| 8,276,125 B2 | 9/2012 | Fan et al. | |
| 8,370,824 B2 | 2/2013 | Arcese | |
| 8,397,227 B2 | 3/2013 | Fan et al. | |

(Continued)

FOREIGN PATENT DOCUMENTS

EP  1124183  8/2001

OTHER PUBLICATIONS

Liang, Sheng, and Gilad Bracha. "Dynamic class loading in the Java virtual machine." Acm sigplan notices 33.10 (1998): 36-44.*

(Continued)

*Primary Examiner* — Matthew Brophy
(74) *Attorney, Agent, or Firm* — Tucker Ellis LLP

(57) ABSTRACT

A system and method can support distributed class loading in a computing environment, such as a virtual machine. A class loader can break a classpath into one or more subsets of a classpath, wherein the classpath is associated with a class. Furthermore, the class loader can use one or more threads to locate the class based on said one or more subsets of the classpath. Then, the class loader can load the class after a said thread locates the class.

20 Claims, 4 Drawing Sheets

(56) References Cited

U.S. PATENT DOCUMENTS

| | | | | |
|---|---|---|---|---|
| 8,612,960 B2* | 12/2013 | Petev | | G06F 9/445 |
| | | | | 717/166 |
| 8,661,426 B2* | 2/2014 | Chapman | | G06F 9/44521 |
| | | | | 717/162 |
| 2001/0051970 A1 | 12/2001 | Webb | | |
| 2005/0268294 A1* | 12/2005 | Petev | | G06F 9/445 |
| | | | | 717/166 |
| 2006/0041880 A1* | 2/2006 | Martin | | G06F 9/445 |
| | | | | 717/166 |
| 2006/0161896 A1* | 7/2006 | Hicks | | G06F 11/362 |
| | | | | 717/124 |
| 2007/0061795 A1* | 3/2007 | Atsatt | | G06F 9/445 |
| | | | | 717/166 |
| 2007/0061796 A1* | 3/2007 | Atsatt | | G06F 9/44536 |
| | | | | 717/166 |
| 2007/0061797 A1* | 3/2007 | Atsatt | | G06F 9/445 |
| | | | | 717/166 |
| 2007/0180442 A1* | 8/2007 | Oi | | G06F 9/445 |
| | | | | 717/166 |
| 2007/0245331 A1* | 10/2007 | Daynes | | G06F 9/44521 |
| | | | | 717/166 |
| 2009/0089563 A1* | 4/2009 | Cabillic | | G06F 9/4881 |
| | | | | 712/228 |
| 2009/0282395 A1* | 11/2009 | Petev | | G06F 9/445 |
| | | | | 717/166 |
| 2010/0198885 A1* | 8/2010 | Bacon | | G06F 12/0269 |
| | | | | 707/813 |
| 2011/0082892 A1* | 4/2011 | Ogasawara | | G06F 9/526 |
| | | | | 707/819 |

OTHER PUBLICATIONS

Akai, Y., et al., "Development of the strong migration mobile agent system AgentSphere for autonomic distributed processing", IEEE Pacific Rim Conference on Communications, Computers and Signal Processing, Aug. 2009, pp. 582-587.

Chen, F. G., et al., "Design, and implementation of a Java execution environment", International Conference on Parallel and Distributed Systems, Dec. 1998, pp. 686-692.

Wenzhang Zhu, et al., "JESSICA2: a distributed Java Virtual Machine with transparent thread migration support", IEEE International Conference on Cluster Computing, 2002, pp. 381-388.

\* cited by examiner

SYSTEM AND METHOD FOR SUPPORTING DISTRIBUTED CLASS LOADING IN A VIRTUAL MACHINE (VM)

CLAIM OF PRIORITY

This application claims the benefit of priority to U.S. Provisional Application titled "SYSTEM AND METHOD FOR SUPPORTING DISTRIBUTED CLASS LOADING IN A VIRTUAL MACHINE (VM)", Application No. 62/063,652, filed Oct. 14, 2014, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting class loading in a computing environment.

BACKGROUND

Software application servers, examples of which include Oracle WebLogic Server (WLS) and GlassFish™, generally provide a managed environment for running enterprise software applications. Presently, class loaders, such as class loaders associated with Java™ load classes from classpaths in sequential search and load.

SUMMARY

Described herein are a system and method that can support distributed class loading in a computing environment, such as a virtual machine. A class loader can break a classpath into one or more subsets of a classpath, wherein the classpath is associated with a class. Furthermore, the class loader can use one or more threads to locate the class based on said one or more subsets of the classpath. Then, the class loader can load the class after a said thread locates the class.

At present JVM classloader loads classes from classpath in sequential search and load. Instead classes can be loaded by doing a distributed search. A distributed search can make use of multiple threads and multicore processors of a system and load classes in a faster way.

DETAILED DESCRIPTION

Figure 1:
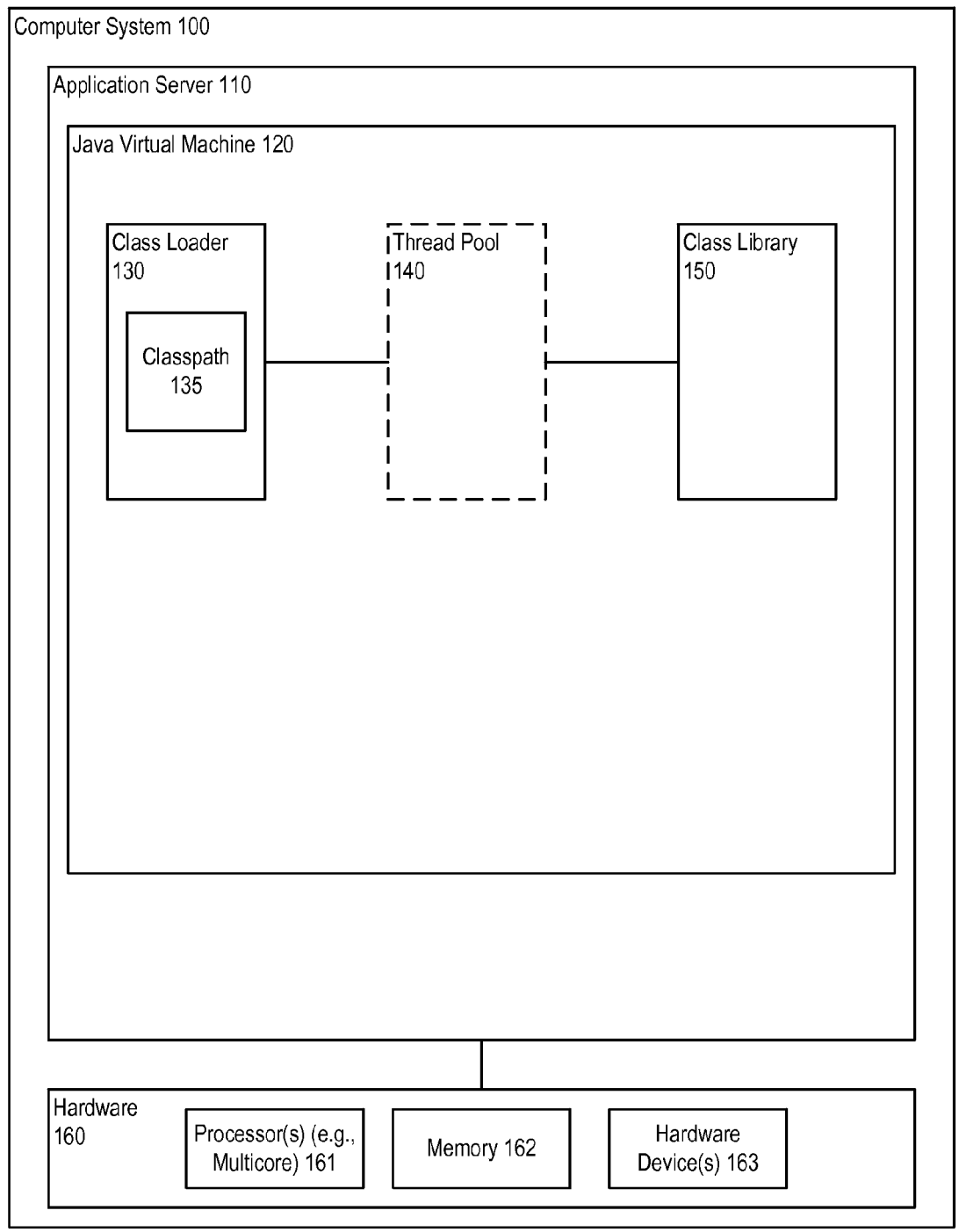
FIG. 1 shows an illustration of supporting class loading in a computing environment, in accordance with an embodiment of the invention.

Described herein are systems and methods that can support class loading in a computing environment, such as a virtual machine.

Java™ may be described as a class-based, platform-independent programming language. A virtual machine may be generally described as a software implementation of a central processing unit (CPU) that runs compiled code (e.g., applets and applications) on a given system or machine, where the code itself remains the same from one system or machine to another. In Java™ technology, the virtual machine that runs compiled Java™ code is referred to as a Java Virtual Machine (JVM). In the JVM, the basic unit of software is the (Java™) class. A class-based software application (e.g., a Java™ application or applet) running in a virtual machine (e.g., a JVM) might consist of tens, hundreds, or thousands of classes. A class is generally composed of fields that hold data or references to other objects, and methods. The body of each method contains executable instructions (bytecode) that implements a part of the program logic. In order to use a class—to access the data it stores or to execute its methods—the virtual machine (e.g., JVM) first loads the class into memory.

Class Loaders

Class loaders are one of the cornerstones of virtual machine architectures such as the Java™ Virtual Machine (JVM™) architecture. A class loader is an object that is responsible for loading classes. Programmatically speaking, class loaders are objects that may be defined in code (e.g. Java™ code). In Java™ technology, class loaders are instances of subclasses of abstract class ClassLoader. Class loaders enable a system (e.g., a virtual machine) to load classes without knowing anything about the underlying file system semantics, and allow applications to dynamically load classes such as Java™ classes as extension modules.

Given the name of a class, a class loader attempts to locate or generate data that constitutes a definition for the class. A typical strategy is to transform the name into a file name and then read a "class file" of that name from a file system. A default class loading behavior in the JVM is to load the class file from a specified location (e.g., specified in a class path) into the memory and to execute the bytecode when the request comes in for the particular class. Whenever a class refers to another class, for example, by initializing a field or local variable, a referent is immediately loaded (or delegated by that class loader to its parent class loader) by the same class loader that loaded the referencing class. A java class path can be a path that the Java™ runtime environment searches for classes and other resource files.

In Java™ technology, a class loader loads the bytecode from a class's class file into the Java™ Virtual Machine (also referred to herein as VM), making it available for use in an application. Java™ technology includes the abstract class java.lang.ClassLoader, also referred to herein as ClassLoader or class loader. Java™ code that retrieves bytecode for use in defining classes extends ClassLoader. A given class loader can load only one class of a given name. Different class loaders may load the same or different bytecode using the same class name. The VM's type system considers such classes to be different; each class is implicitly qualified by the class loader that loads it. The JVM associates a defined class with the specific class loader that invokes defineClass (also referred to herein as the define class method) for that class.

Distributed Class Loading

In accordance with an embodiment of the invention, a class loader can use a distributed search for loading one or more classes based on a classpath, which contains a set of paths to where the class files may be located.

Embodiments of the invention provide systems and methods for providing class loading for JAVA applications.

Referring now to FIG. 1, which is a block diagram that illustrates a system capable of supporting distributed class loading in a virtual machine, in accordance with an embodiment. In an embodiment, a computer system 100 can execute a java virtual machine (JVM) 120 and provide an application server 110. The computer system 100 may include a server machine or a cluster of server machines. The computer system 100 may be accessed by one or more clients and/or client applications over, for example, a network (not shown).

In accordance with an embodiment, the computer system 100 can additionally include hardware 160. The hardware 160 can include one or more processor(s) 161 (e.g., multi-core processors). The hardware 160 can additionally include memory 162, which can include one or more hardware and software devices, which can be located internally and externally to the computer system 100. The hardware 160 can also include additional hardware devices 163, such as, but not limited to, networking devices.

In accordance with an embodiment, the java virtual machine 120 can include a class loader 130, such as a Java™ class loader, a thread pool 140, and a class library 150. The class loader 130 can also be associated with a classpath 135.

In accordance with an embodiment, the class loader 130 can create a number of threads within the thread pool in order to perform a distributed search for a class within the class library 150.

Figure 2:
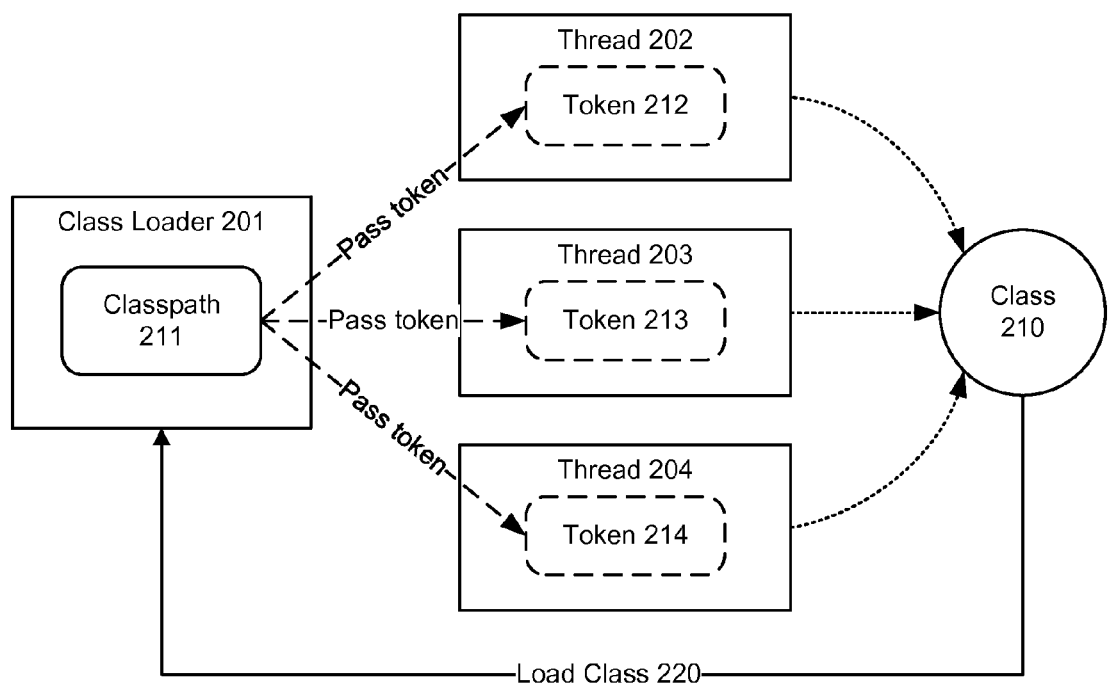
FIG. 2 shows an illustration of supporting distributed class loading in a computing environment, in accordance with an embodiment.

FIG. 2 shows an illustration of supporting distributed class loading in a computing environment, in accordance with an embodiment. As shown in FIG. 2, a class loader 201 (e.g. a top-level class loader) can load a class 210 into a computing environment, e.g. a virtual machine (VM) 200, based on a classpath 211. Furthermore, the class loader 201 can initiate (or create) a set of threads, e.g. threads 202-204, which can be made configurable.

In accordance with an embodiment, the classpath 211 can be broken into a set of tokens, e.g., tokens 212-214, each of which can represent a subset of the classpath 211. Then, the different subsets of the classpath 211 (i.e., tokens 212-214) can be passed to the threads 202-204, each of which can attempt to load the class based on the received subset of the classpath 211 (i.e., the tokens 212-214).

As shown in FIG. 2, once the class 210 is located by a thread, such as thread 202, the thread that located the requested class can pass the detail information to the class loader 201. Then, the class loader 201 can load 220 the class 210 accordingly In accordance with an embodiment of the invention, the class loading process can be controlled to ensure that a specific classpath order can be maintained.

For example, the system can provide the various threads 202-204 with different, unique order numbers (i.e., each thread having a different order number from the other threads involved with the class search), e.g. based on the classpath orders as defined in a specification, such as the Java™ Virtual Machine specification. The class loader 201 can ensure that, for example, a thread with a higher order number will wait for a thread with a lower order number to complete, if the thread with the higher order number locates the class. That is, if a thread with a non-lowest order number locates a requested class, that thread can wait for other threads having a lower order number to complete before passing information to the class loader. The class loader 201 can give the preference to a thread with a lower order number, if the thread with the lower order number locates the class. In other words, if two threads locate a requested class, the class loader can give preference to a thread having a lower order number.

For example, in accordance with an embodiment, thread 204 has a higher order number than thread 202. If a situation where thread 204 locates the a requested class first out of all the threads searching for the requested class, thread 204 will wait for the threads with a lower order number to complete before passing the class detail information to the class loader. If the threads with a lower order number do not locate the requested class, then the thread 204 will pass the class detail information to the class loader, which in turn will load the requested class. If, however, a thread with a lower order number also locates the requested class, the thread with the lower order number will pass the class information to the class loader. In this manner, the classpath order as defined in Java™ Virtual Machine specification can be maintained.

In accordance with an embodiment, in situations where the Java™ Virtual Machine specification can be ignored, the class loader 201 can ignore the classpath order, if the JVM 200 does not implement such restriction. In such situations, the thread that locates a requested class first will pass the details to the class loader, which can then load the class. Additionally, the class loader 201 can allow the classpath to be defined using a "wildcard" order.

In accordance with an embodiment of the invention, using the distributed class loading approach, the class loader 201 can search and load a class 210 quickly and efficiently. Otherwise, if class loader 201 searches and loads classes from the classpath 211 using a sequential approach, it may take a long time to perform a simple small class loading when large jar files are presented in the classpath 211.

Additionally, using the distributed class loading approach, the system can perform the tasks, which are not related to a particular class loading operation, in parallel. Otherwise, the class loading operation may block the execution of an application until a class is completely loaded. Thus, the system can significantly improve the class loading performance in the VM 200 (such as a Java VM) and reduce application response time.

Furthermore, using the distributed search approach, the system can take advantage of the multicore hardware systems and can load classes more efficiently.

Figure 3:
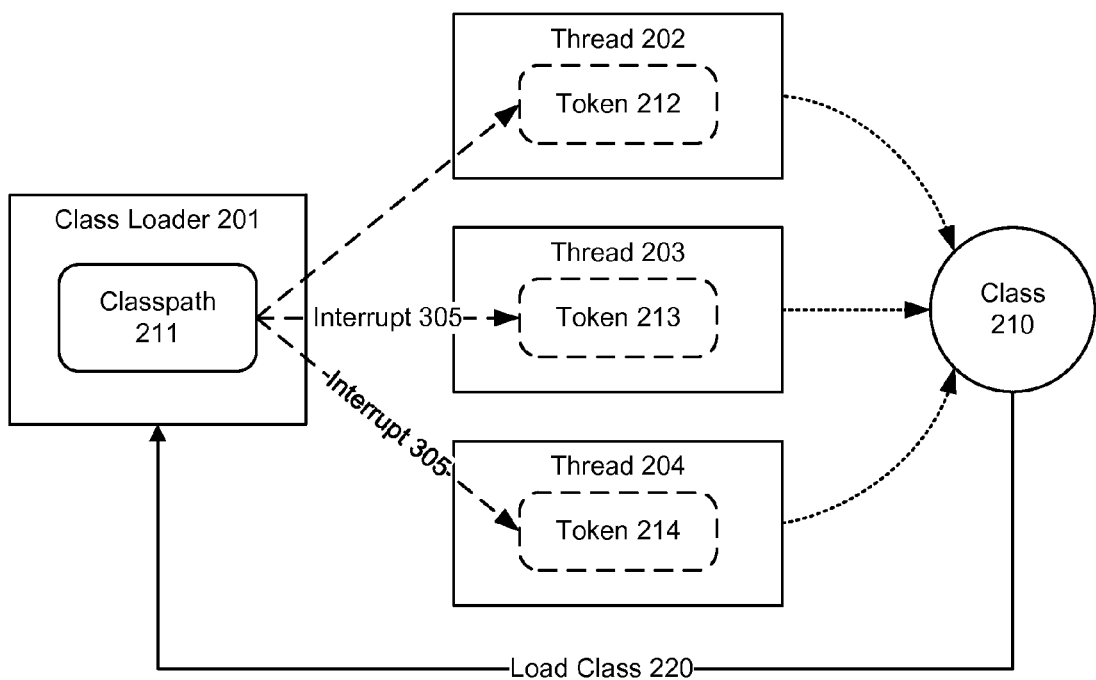
FIG. 3 shows an illustration of supporting distributed class loading in a computing environment, in accordance with an embodiment.

FIG. 3 shows an illustration of supporting distributed class loading in a computing environment, in accordance with an embodiment. In the figure, the requested class 210 has been located by thread 202. Upon the class being located, the class loader 201 can interrupt 305 the processing of the other threads, such as the threads 203-204. In this manner, the threads 203 and 204 can be made available to perform other work within the system.

Figure 4:
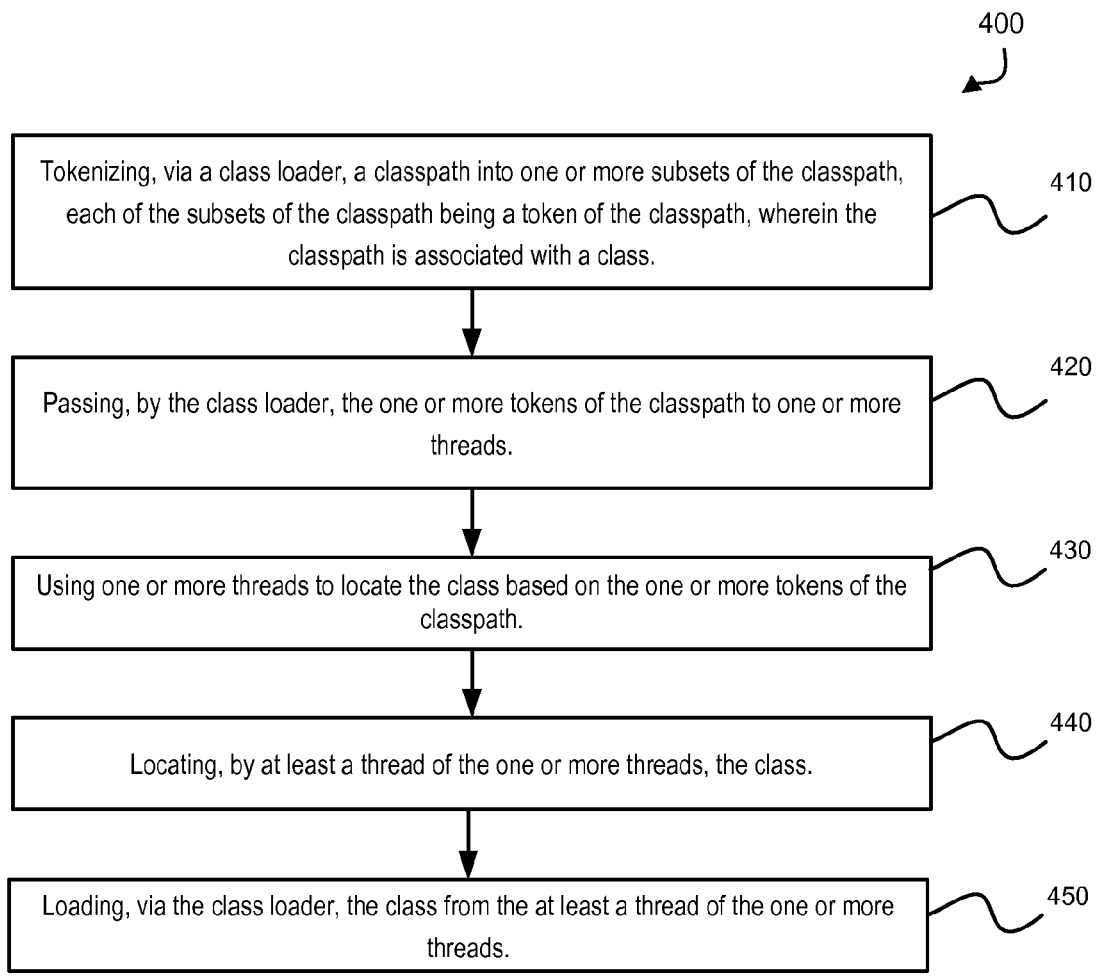
FIG. 4 shows an illustrative flowchart depicting a method for supporting distributed class loading in a computing environment, in accordance with an embodiment.

FIG. 4 shows an illustrative flowchart depicting a method for supporting distributed class loading in a computing environment, in accordance with an embodiment. An exemplary method 400 can begin at step 410 with tokenizing, via a class loader, a classpath into one or more subsets of the classpath, each of the subsets of the classpath being a token of the classpath, wherein the classpath is associated with a class.

At step 420, the method continues with passing, by the class loader, the one or more tokens of the classpath to one or more threads.

At step 430, the method can use the one or more threads to locate the class based on the one or more tokens of the classpath.

At step 440, the class can be located by at least a thread of the one or more threads. Finally, at step 450, the class can be loaded, via the class loader, from the at least a thread of the one or more threads.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In some embodiments, the present invention includes a computer program product which is a non-transitory storage medium or computer readable medium.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting distributed class loading in a computing environment, comprising: tokenizing, via a class loader, a classpath into a plurality of subsets of the classpath, each of the subsets of the classpath being a token of the classpath, wherein the classpath is associated with a class; passing, by the class loader, each of the plurality of tokens of the classpath to a different thread of a plurality of threads; using the plurality of threads to locate the class based on the plurality of tokens of the classpath; locating, by at least a thread of the plurality of threads, the class; and loading, via the class loader, the class from the at least a thread of the plurality of threads.

2. The method of claim 1, further comprising: associating each of the plurality of threads with a unique order number, and upon more than one thread locating the class, loading the class from the thread having the lowest unique order number.

3. The method of claim 2, further comprising: upon a thread having a non-lowest unique order number locating the class, delaying loading the class until all threads having a lower order number than the thread that located the class completes.

4. The method of claim 1, further comprising: upon the locating, by the at least a thread of the plurality of threads, the class, sending, via the class loader, an interrupt to all threads that did not locate the class.

5. The method of claim 1, wherein the class is loaded, via the class loader, from a first thread that locates the class.

6. The method of claim 1, wherein the computing environment comprises at least one multicore processor.

7. The method of claim 1, wherein the computing environment comprises a java virtual machine.

8. A system for supporting distributed class loading in a computing environment, comprising: one or more microprocessors; and a processor, running on the one or more microprocessors, wherein the processor operates to perform steps comprising: tokenizing, via a class loader, a classpath into a plurality of subsets of the classpath, each of the subsets of the classpath being a token of the classpath, wherein the classpath is associated with a class; passing, by the class loader, each of the plurality of tokens of the classpath to a different thread of a plurality of threads; using the plurality of threads to locate the class based on the plurality of tokens of the classpath; locating, by at least a thread of the plurality of threads, the class; and loading, via the class loader, the class from the at least a thread of the plurality of threads.

9. The system of claim 8, wherein the processor operates to perform the steps further comprising: associating each of the plurality of threads with a unique order number, and upon more than one thread locating the class, loading the class from the thread having the lowest unique order number.

10. The system of claim 9, wherein the processor operates to perform the steps further comprising: upon a thread having a non-lowest unique order number locating the class, delaying loading the class until all threads having a lower order number than the thread that located the class completes.

11. The system of claim 8, wherein the processor operates to perform the steps further comprising: upon the locating, by the at least a thread of the plurality of threads, the class, sending, via the class loader, an interrupt to all threads that did not locate the class.

12. The system of claim 8, wherein the class is loaded, via the class loader, from a first thread that locates the class.

13. The system of claim 8, wherein the computing environment comprises at least one multicore processor.

14. The system of claim 8, wherein the computing environment comprises a java virtual machine.

15. A non-transitory machine readable storage medium having instructions stored thereon for supporting distributed class loading in a computing environment that when executed cause a system to perform steps comprising: tokenizing, via a class loader, a classpath into a plurality of subsets of the classpath, each of the subsets of the classpath being a token of the classpath, wherein the classpath is associated with a class; passing, by the class loader, each of the plurality of tokens of the classpath to a different thread of a plurality of threads, wherein each of the plurality of threads are created by the classloader; using the plurality of threads to locate the class based on the plurality of tokens of the classpath; locating, by at least a thread of the plurality of threads, the class; and loading, via the class loader, the class from the at least a thread of the plurality of threads.

16. The non-transitory machine readable storage medium of claim 15, the steps further comprising: associating each of the plurality of threads with a unique order number, and upon more than one thread locating the class, loading the class from the thread having lowest unique order number.

17. The non-transitory machine readable storage medium of claim 16, the steps further comprising: upon a thread having a non-lowest unique order number locating the class, delaying loading the class until all threads having a lower order number than the thread that located the class completes.

18. The non-transitory machine readable storage medium of claim 15, the steps further comprising: upon the locating, by the at least a thread of the plurality of threads, the class, sending, via the class loader, an interrupt to all threads that did not locate the class.

19. The non-transitory machine readable storage medium of claim 15, wherein the class is loaded, via the class loader, from a first thread that locates the class.

20. The non-transitory machine readable storage medium of claim 15, wherein the computing environment comprises at least one multicore processor.

\* \* \* \* \*

UNITED STATES PATENT AND TRADEMARK OFFICE
CERTIFICATE OF CORRECTION

PATENT NO. : 9,870,237 B2  
APPLICATION NO. : 14/878280  
DATED : January 16, 2018  
INVENTOR(S) : Kulkarni et al.

Page 1 of 1

It is certified that error appears in the above-identified patent and that said Letters Patent is hereby corrected as shown below:

In the Specification

Column 1, Line 37, delete "JavaTM" and insert -- JavaTM, --, therefor.

Column 3, Line 57, delete "accordingly" and insert -- accordingly. --, therefor.

Column 4, Line 14, delete "the a" and insert -- a --, therefor.

In the Claims

Column 7, Line 5, in Claim 16, after "having" insert -- the --.

Signed and Sealed this  
Ninth Day of July, 2019

Andrei Iancu  
*Director of the United States Patent and Trademark Office*